H. B. CLEMENS.
BOLT TIGHTENER.
APPLICATION FILED MAY 14, 1920.
1,386,455.
Patented Aug. 2, 1921.
4 SHEETS—SHEET 1.
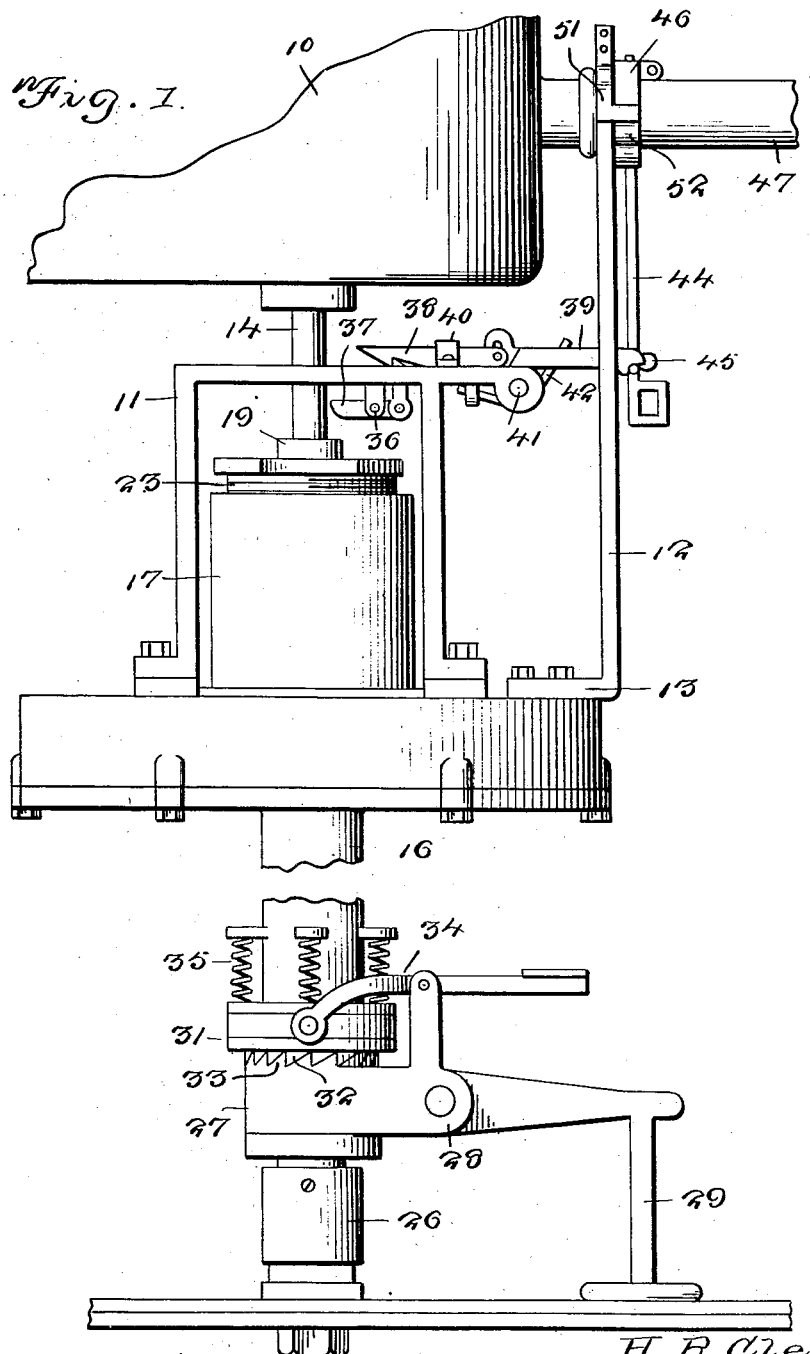

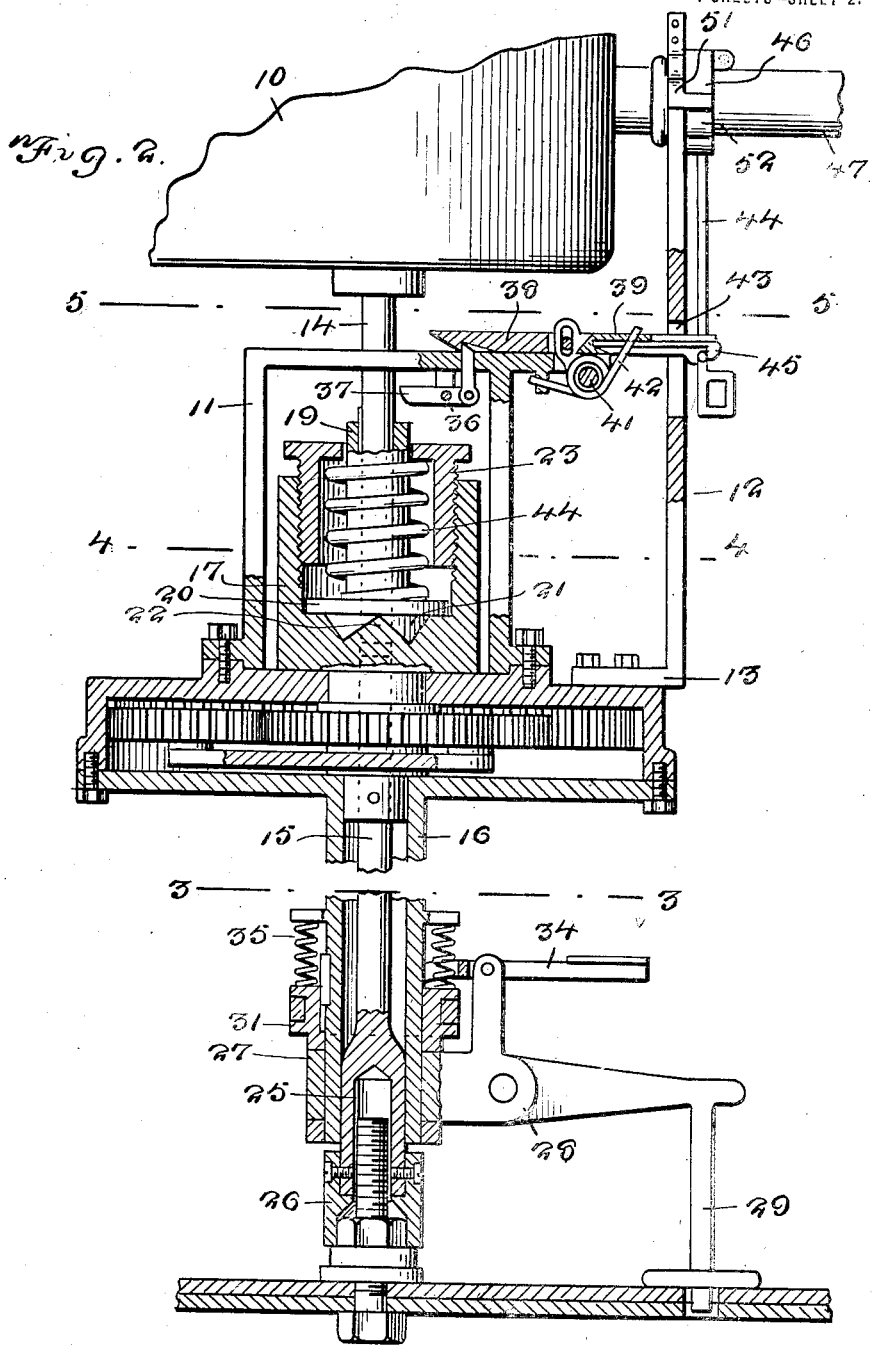

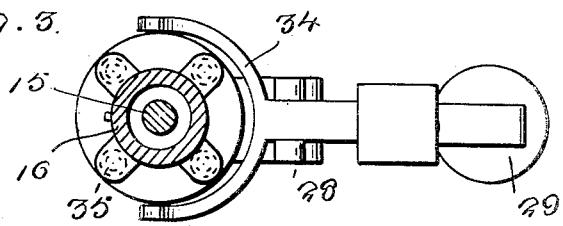
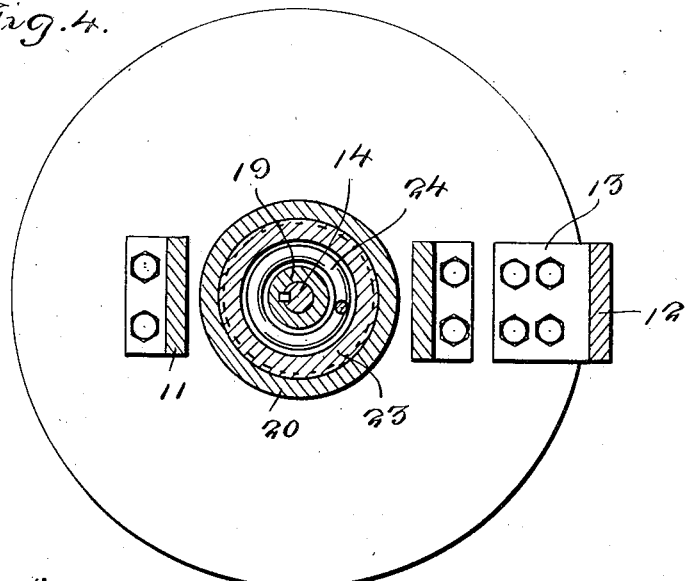
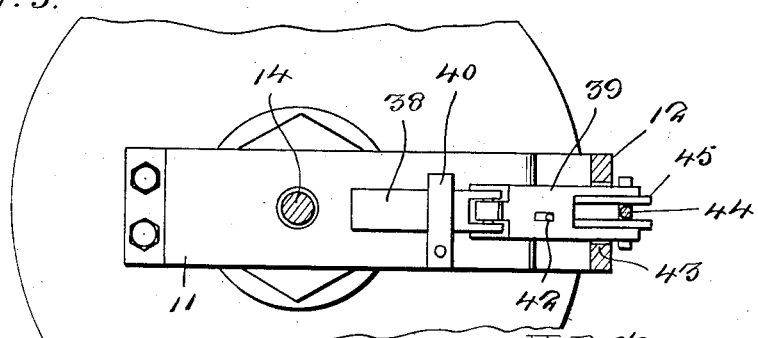

H. B. CLEMENS.
BOLT TIGHTENER.
APPLICATION FILED MAY 14, 1920.
1,386,455.
Patented Aug. 2, 1921.
4 SHEETS—SHEET 4.
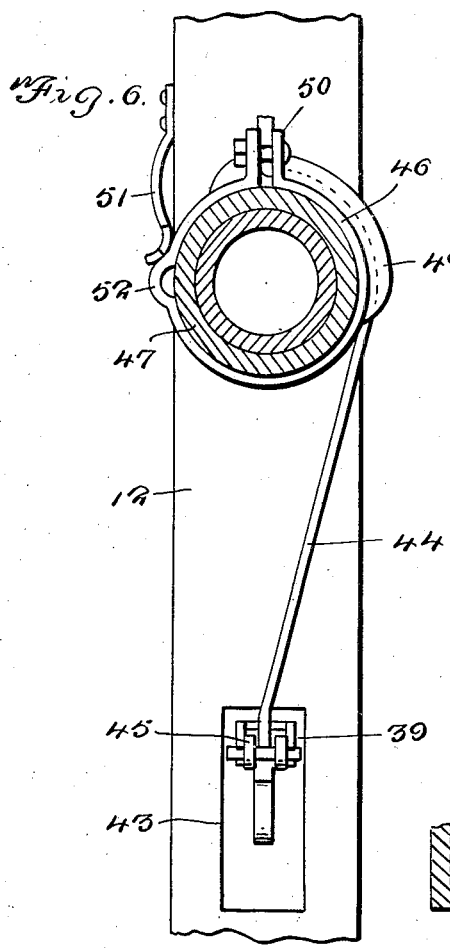
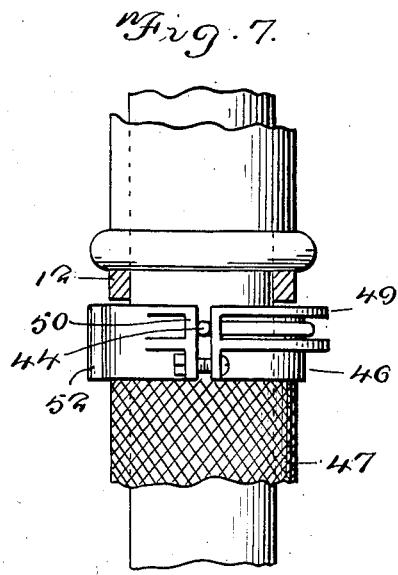
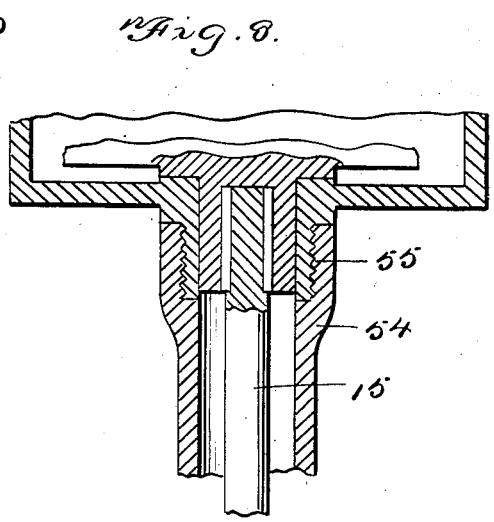

UNITED STATES PATENT OFFICE.

HARRY BARTON CLEMENS, OF PORT ORCHARD, WASHINGTON.

BOLT-TIGHTENER.

1,386,455.  Specification of Letters Patent.  Patented Aug. 2, 1921.

Application filed May 14, 1920. Serial No. 381,391.

*To all whom it may concern:*

Be it known that I, HARRY B. CLEMENS, citizen of the United States, residing at Port Orchard, in the county of Kitsap and State of Washington, have invented new and useful Improvements in Bolt-Tighteners, of which the following is a specification.

This invention relates to improvements in nut tightening machines.

An object of the invention is the provision of a motor operated machine for tightening nuts, in which the operation of the motor will be automatically stopped when the nut has been sufficiently tightened, so that stripping the bolts will be prevented.

Another object is the provision of novel means for yieldingly connecting the nut engaging member with a driven shaft, the operation of this yielding connection acting upon the motor controlling means to automatically stop the operation of the motor.

Another object is the provision of means for yieldingly holding the casing of the machine against rotation, which permits of the operation of the machine in various places and positions, so that it may be readily moved about the work.

Other objects and advantages of the invention will appear as the following description is read in connection with the accompanying drawings.

In the drawings:—

Figure 1 is a side elevation of a nut tightening machine embodying the present invention, Fig. 2 is a vertical sectional view of the same.

Fig. 3 is a section on the line 3—3 of Fig. 2.

Fig. 4 is a similar view on the line 4—4 of Fig. 2.

Fig. 5 is a like view on the line 5—5 of Fig. 2.

Fig. 6 is a sectional elevation illustrating the connection with a motor controlling lever.

Fig. 7 is an enlarged plan of the same.

Fig. 8 is a sectional view showing a modified form of the invention.

Referring to the drawings in detail, like characters of reference denote corresponding parts throughout the several views.

The machine which is illustrated in the accompanying drawings is operated from a motor, for example, an air motor, a portion of which is shown at 10. The machine comprises a casing 11 which is secured to the casing of the motor as by an arm 12, the latter being connected to the casing 11 of the machine as indicated at 13.

The shaft of the motor which is shown at 14, extends within the machine casing 11 and is rotatable therein. Also mounted for rotation within the machine casing is a shaft 15, the latter being alined with the shaft 14 and operating within a tubular extension 16 of the machine casing. The shafts 14 and 15 are yieldably connected together for simultaneous rotation through the medium of a clutch which includes a cup shaped member 17, secured to the shaft 15. The shaft 14 extends within the cup shaped member 17 and has a bearing in the lower end of the same. Mounted upon the shaft 14 and capable of longitudinal and rotary movement thereon is a sleeve 19 which forms a part of the clutch. This sleeve is provided at one end with a disk 20 having spaced projections or teeth 21 upon its lower face. These projections or teeth engage similar projections or teeth 22 provided in the bottom of the cup shaped member 17. The member 17 is internally threaded and receives a closure member 23, having an opening in the top thereof for the passage of the upper end of the sleeve 19. A coiled spring 24 is located within the cup shaped member 17 and has one end bearing upon the disk 20 and its opposite end bearing against the inner face of the closure member 23, the purpose being to yieldably hold the teeth 21 and 22 in engagement. By this means rotation of the shaft 14 will impart a like movement to the shaft 15.

The shaft 15 carries at its lower end a socket 25 and secured to the lower end of this socket is a nut engaging member 26, the latter being removably secured in position so as to provide for the attachment of nut engaging members of different sizes.

Rotatably mounted upon the tubular extension 16 of the machine casing is a sleeve 27 which carries an arm 28, the latter carrying at one end a downwardly extending arm 29 which is adapted for engagement with bolt receiving openings provided in the work. Slidably mounted upon the tubular extension 16, and held against rotary movement thereon is a clutch member 31 having teeth 32 for engagement with teeth 33 formed upon the sleeve 27. The clutch member 31 has pivotally secured thereto an operating member 34, by means of which the teeth 32 and 33 may be disengaged, the said teeth being yieldingly held in engagement by means of springs 35. The machine casing 10 is thus yieldingly held against rotation.

Pivotally mounted within the machine casing 11 as indicated at 36 is a dog 37, one end of this dog being located in the path of movement of the sleeve 19, while the opposite end of the dog engages a trigger 38 which is connected to a lever 39. The trigger is yieldingly held in engagement with the dog 37 by means of a spring 40. The lever 39 is pivotally mounted as shown at 41 and is yieldably held against movement by a spring 42. The lever also extends through an opening 43 in the arm 12 and has one end detachably connected to one end of a flexible element 44, a spring 45 to yieldably hold the lever 39 and the flexible element 44 already positioned. The opposite end of the flexible element 44 is connected to a split band 46, the latter surrounding the valve handle or lever 47 which controls the motor 10, which handle or lever is rotated to control the operation of the motor. The flexible element 44 is guided between flanges 49 formed on the split ring and is connected to said ring as shown at 50. For the purpose of holding the lever or handle 47 against accidental rotation, the arm 12 has secured thereto a spring detent 51 which engages an offset 52 of the split ring and in order to operate the valve of the motor sufficient pull must be exercised by the flexible element 44 to overcome the tension of the spring detent.

In the operation of the machine, after the nut engaging member 26 has been positioned over the nut, the motor is started and the nut will be turned upon the bolt until it has reached its proper position, whereupon the teeth 21 will ride upon the teeth 22, moving the sleeve 19 longitudinally of the shaft 14 until it engages the dog 37. This will release the trigger 38 and permit the lever 39 to be moved upon its pivot under the action of the spring 42. This movement of the lever 39 will, through the flexible connection 44 rotate the valve handle and cut off the supply of air to the motor, so that the operation of the latter will be automatically stopped.

The machine is equipped with suitable differential gearing which is located within the inclosed portion 53 of the machine casing.

In Fig. 8 there is illustrated a modified form of the invention in which the nut engaging operation of the machine is separate and detachable from the machine proper so as to form the substitution of different parts. For this purpose the tubular extension which surrounds the shaft 15 and which is indicated at 54, is threadedly secured to the machine casing proper by left hand threads 55, which permits of its removal when desired. Various other changes may be made in the form, proportions and minor details of construction and the right is herein reserved to make such changes as properly fall within the scope of the appended claims.

Having described the invention what is claimed is:—

1. The combination with a motor, of a nut tightening machine comprising a casing, a nut engaging member rotatable therein, means connecting the nut engaging member and motor for rotating the former, means controlled by the nut engaging and motor connecting means for controlling the operation of the motor and means yieldingly secured to the casing for holding the latter against rotation.

2. The combination with a motor, of a nut tightening machine comprising a casing, a nut engaging member rotatable therein, means connecting the nut engaging member and motor for rotating the former, means controlled by the nut engaging and motor connecting means for controlling the operation of the motor, an arm rotatably mounted upon the casing for engagement with a stationary object and means carried by the casing and yieldably connected to the arm for holding said casing against rotation.

3. A nut tightening means comprising a casing, a nut engaging member mounted for rotation therein, a motor operated shaft mounted in said casing, means for yieldably connecting the motor operated shaft and the nut engaging member and means operated by the motor and nut engaging connecting means for automatically stopping the operation of the motor.

4. A nut tightening machine comprising a casing, a nut engaging member mounted for rotation therein, a motor operated shaft mounted in said casing, means including a spring pressed locking member for yieldably connecting the motor operated shaft and the nut engaging member and means operated by the motor and nut engaging connecting means for automatically stopping the operation of the motor.

5. A nut tightening machine comprising a casing, a nut engaging member mounted for rotation therein, a motor operated shaft mounted in said casing, means for yieldably connecting the motor operated shaft and the nut engaging member and means including a spring actuated locking lever released by the motor and nut engaging connecting means for automatically stopping the operation of the motor.

6. A nut tightening machine comprising a casing, a nut engaging member mounted for rotation therein, a motor operated shaft extending within said casing, a sleeve secured to the nut engaging member, a sleeve slidable upon the motor operated shaft and having a yieldable connection with the first mentioned sleeve and means operated by the movement of the slidably mounted sleeve for automatically stopping the operation of the motor.

7. A nut tightening machine comprising a casing, a nut engaging member mounted for rotation therein, a motor operated shaft mounted in said casing, a sleeve secured to the nut engaging member, a sleeve slidable upon the motor operated shaft and having a yieldable connection with the first mentioned sleeve and trigger operated means controlled by the slidable sleeve for automatically stopping the operation of the motor.

8. A nut tightening machine comprising a casing, a nut engaging member mounted for rotation therein, a motor operated shaft extending within said casing, a sleeve secured to the nut engaging member, a sleeve slidable upon the motor operated shaft and having a yieldable connection with the first mentioned sleeve, a motor controlling lever and a trigger engageable with said lever and operated by the sliding sleeve to release said lever and automatically stop the operation of the motor.

In testimony whereof I affix my signature.

HARRY BARTON CLEMENS.